April 7, 1970 B. LILIEN 3,504,639
FOOD PORTIONING MACHINE
Filed Oct. 18, 1967 2 Sheets-Sheet 1
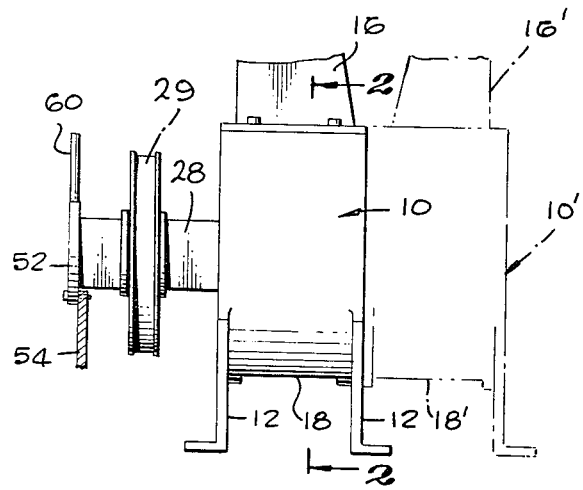
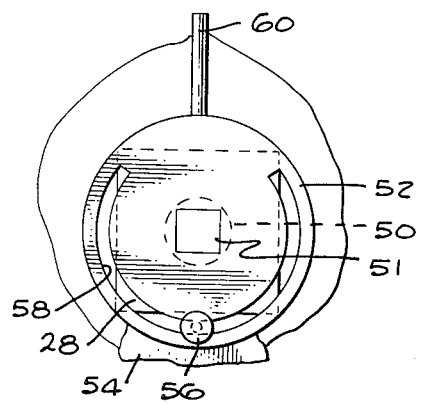
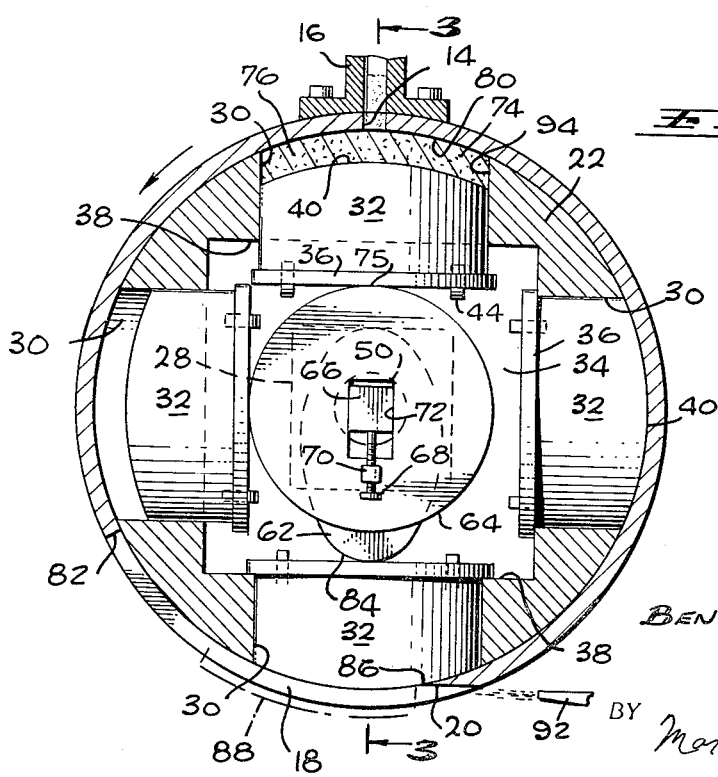
BENJAMIN LILIEN
INVENTOR.
BY Max Gilden
ATTORNEY

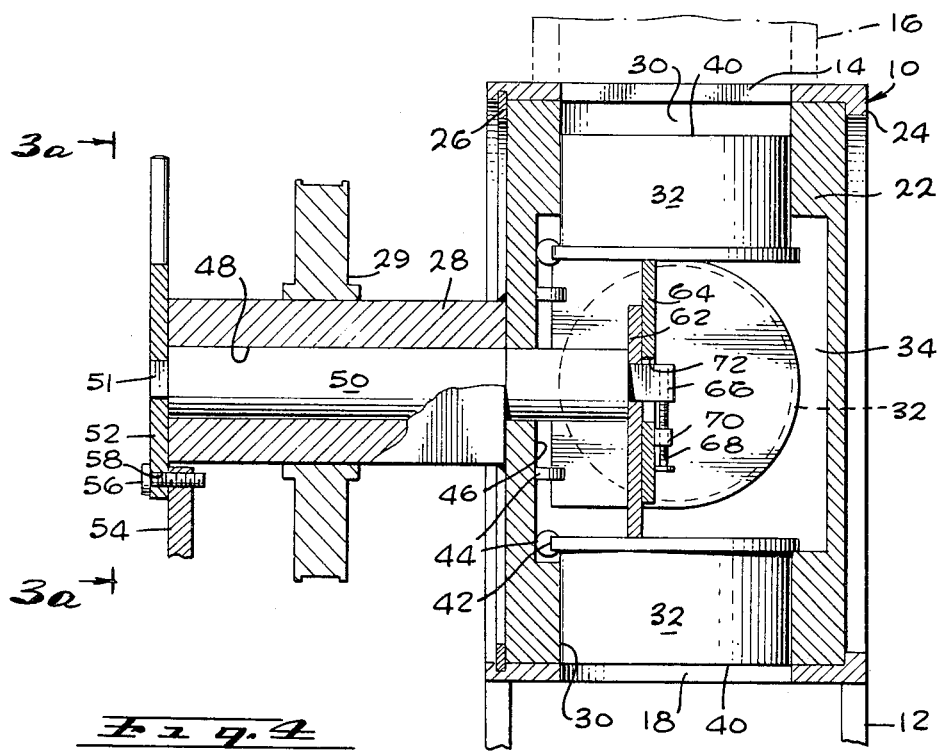
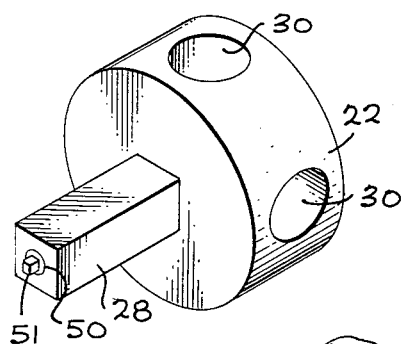
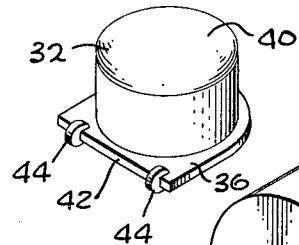
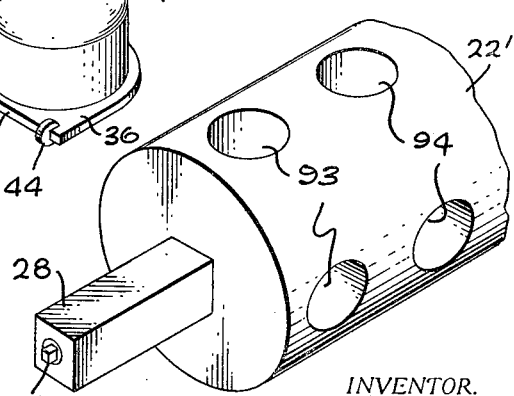
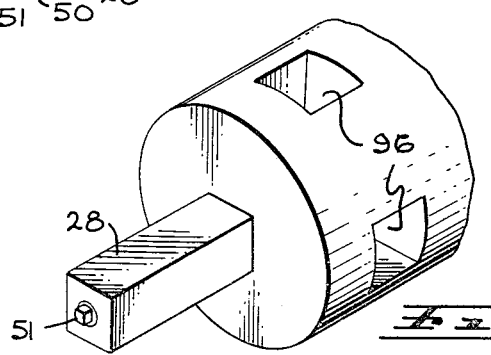

United States Patent Office 3,504,639
Patented Apr. 7, 1970

3,504,639
FOOD PORTIONING MACHINE
Benjamin Lilien, % Los Angeles Meat Co., 3315 E.
Vernon Ave., Los Angeles, Calif. 90058
Filed Oct. 18, 1967, Ser. No. 676,313
Int. Cl. A21c 5/04; A22c 7/00
U.S. Cl. 107—15                    6 Claims

ABSTRACT OF THE DISCLOSURE

Food portioning machine comprising a stationary casing having a filling and a discharge opening, a drum rotatable in the casing, and having a plurality of radially disposde cylinders, each capable of registering with the filling opening while another of the cylinders registers with the discharge opening, the machine being designed so that each of the pistons can reciprocate for a limited distance within their respective cylinders, so that a predetermined amount of material can be received within the outer end of a cylinder against the piston therein when such cylinder is disposed at the filling opening, to form said material into a predetermined shape, and such pre-shaped material portion is ejected from the cylinder by the piston when such cylinder is disposed at the discharge opening, so that by providing a number of such radially disposed cylinders and their respective pistons radially within the drum, a relatively large number, e.g., four or more, preshaped portions of material, such as gound meat patties, can be provided during each revolution of the drum, thus providing a high production rate.

---

This invention relates to an improved food portioning machine, and is particularly concerned with the provision of a machine for providing food portions of a uniform size and shape, and particularly for molding ground meat or food patties for use in cooking on a grill, or to be packaged for future use.

In my U.S. Patent 2,528,234 there is described a patty molding machine embodying a rotating drum having a transversely extending cylinder with a double piston freely working therein to mold the food patties. Although this machine has proven successful, it provides only two molded patties for each revolution of the drum, so that the rate of production is limited by the rate at which the drum can be suitably rotated.

The present invention provides a substantial improvement over the machine of my above patent, in that it permits production of food portions or patties of a predetermined size and shape, at a substantially higher rate than the device disclosed in my above patent.

In the machine of the present invention, there is provided a rotating drum having a plurality, preferably four or more, of radially disposed cylinders each having a reciprocable piston which is independent of any of the other pistons in the other cylinders, with means being provided to limit inner and outer radial movement of each of the pistons so as to provide a space in the outer end of each of the cylinders for receiving a predetermined portion of material and to form it into a predetremined shape, and to discharge the formed food portion or patty from the end of the cylinder at another predetermined radial position of such cylinder and its associated piston.

Briefly, the food portioning machine of the invention comprises a stationary casing having a filling opening and a discharge opening, and a drum rotable in the casing and having a plurality of radially disposed cylinders each capable of registering with the filling opening while another of the cylinders registers with the discharge opening to receive material from the filling opening and to discharge the same from the discharge opening. A free piston is reciprocably disposed in each of the cylinders, but with stop means associated with each of the cylinders limiting outward movement thereof, and including means for preventing rotation of each of the pistons in their respective cylinders.

Stationary cam means is mounted in the casing and within the drum, the inner ends of each of the pistons riding on the cam means during rotation of the drum, and limiting inner radial movement of the pistons, each of the pistons when registering with the filling opening being retracted inwardly on the cam means to permit receiving a predetermined portion of material, for example, ground meat, in the outer end of the cylinder and to form the material into a predetermined shape, and each of the pistons when registering with the discharge opening being urged to its outermost radial position by the cam means to eject the shaped portion of material.

The invention will be more clearly understood by reference to the description below of certain preferred embodiments when taken in connection with the accompanying dawing wherein:

FIGURE 1 is a side elevational view of the machine;
FIGURE 2 is a vertical sectional view taken on line 2—2 of FIGURE 1;
FIGURE 3 is a transverse sectional view taken on line 3—3 of FIGURE 2;
FIGURE 3a is an end view taken on line 3a—3a of FIGURE 3;
FIGURE 4 is a perspective view of the rotating drum, on a reduced scale;
FIGURE 5 is a perspective view of one of the pistons on a reduced scale;
FIGURE 6 illustrates a modification of the invention device; and
FIGURE 7 illustrates another alternative embodiment of the invention.

Referring particularly to FIGURES 2 to 4 of the drawing, a drum 22 is rotatably mounted in the casing ring 10, one side of the drum being held against an inwardly projecting flange 24 at one edge of the casing ring and the other side of the drum being engaged by a retainer ring 26 positioned in the opposite edge of the casing ring to hold the drum 22 in position in the casing. A square shaft 28 extends outwardly from the center of the drum at one side thereof, to which a pulley 29 can be secured in any suitable manner to be driven by a suitable source of power (not shown) for rotating the drum.

A plurality of cylindrical chambers 30, here shown as four in number, are formed in the drum, such cylinders being disposed radially within the chamber and positioned 90 degrees from each other, with the axes of each of the cylinders being in a common plane. Each of the cylinders 30 receives a piston 32 which is free to reciprocate within its cylinder, but is limited in its radially outer and inner movement by means described more fully below. A central inner chamber 34 is provided in the drum 22, such central chamber communicating with the inner open ends of each of the cylinders 30.

Referring particularly to FIGURE 5, each of the pistons 32 working within their respective cylinders 30 is provided with a stop member 36 in the form of a plate at its inner end, which abuts a shoulder 38 on the drum at the inner end of each of the cylinders, to limit outer radial movement of the piston 32, so that the outer curved face 40 of the piston cannot extend beyond the outer periphery of the drum 22. Also, it is seen particularly in FIGURE 5, that the stop member 36 on each of the pistons has a straight side edge 42 carrying a pair of lugs 44. When the pistons 32 are positioned in their respective cylinders 30, the side edge 42 of the piston stop member 36 is disposed adjacent a flat inner side wall 46 of the drum 22, with the lugs 44 positioned in slidable contact with such side wall so that during rotation of the drum 22 and the pistons 32 therein, the pistons are free to reciprocate radially in cylinders 30 but are locked against rotational motion within their respective cylinders 30.

Referring to FIGURE 3, within a circular bore 48 of the square drive shaft 28 is a solid cylindrical member or shaft 50 which is held in non-rotatable position at its outer end by attachment of a shoulder 51 mounted on the outer end of member 50 (see also FIGURE 3a) to a plate 52 in turn connected to a stationary plate 54 by means of the set screw 56 which is received within an arcuate slot 58 of member 52. The member 52 carries a handle 60 to permit rotational adjustment of the plate 52 by means of the set screw and slot arrangement, for a purpose noted hereinafter.

On the inner end of the member 50 there are mounted a pair of cams 62 and 64 in contact with each other. Cams 62 and 64 are both mounted on a square member or block 66, attached to the inner end of member 50, cam 62 being fixed to the block and cam 64 being connected to block 66 by a screw 68 having threaded engagement at its upper end with the block 66, the screw being mounted at 70 on the outer cam 64. The cam 64 has a slot 72 therein which receives the block 66 to permit limited radial adjustment of cam 64 on member 66. Thus, by turning screw 68, the cam 64 is caused to slide radially over the adjacent surface of cam 62, such adjustment of cam 64 being for the purpose of varying the thickness of the molded food portions, as described more fully below.

In operation of the device described above, the drum 22 is rotated by the drive pulley 29 to cause one end of a cylinder 30 to pass under the filler opening 14 while another diagonally disposed cylinder 30 is passing over the discharge opening 18, the drum being rotated in a direction as shown by the arrow in FIGURE 2 of the drawing.

Ground meat or other food is forced through nozzle 16 by means of a meat grinder or the like and the pressure of the food entering the upper end 74 of the cylinder at the opening 14 forces the piston 32 against the high shoulder or lobe 75 of the cam 64, disposed radially outward adjacent the filling opening 14, forming a lower stop for the piston. Thus, a mold or patty 76 of food is formed between the rounded upper surface 40 of piston 32 and the adjacent inner surface 80 of the casing ring 10.

After the food from nozzle 16 fills the mold 74 as the piston passes across the filling opening 14, the molded food portion 76 is carried around casing ring 10 with the drum 22 as the lower end member 36 of the piston rides on the edge of cam 64, until it reaches the near edge 82 of the discharge opening 18. Shortly after reaching this position and upon continued rotation, member 36 of the piston commences to ride on the lower shoulder or lobe 84 of cam 62, which is disposed radially outward at discharge opening 18, forcing the piston radially outward and gradually forcing the molded food portion or patty radially outward so that when the piston reaches a position where one side thereof is adjacent the scraper edge 86 at the lower end of the discharge opening, substantially the entire thickness of the molded food portion has been pushed outwardly to the outer periphery of drum 22 as indicated by dotted lines 88 in FIGURE 2. The scraper 20 on the far edge of the discharge opening 18 with respect to the direction of travel of the drum will scrape the molded food portion or patty from the outer surface of the piston and maintain the pistons clean. The piston from which the molded food portion or patty was discharged continues to rotate as shown until it again reaches a position adjacent the filler opening 14 to receive an additional portion of food, and the cycle is repeated.

It will thus be seen that for each revolution of the drum 22, four molded food portions or patties are produced.

If desired, although not necessary, an air nozzle 92 can be positioned adjacent the scraper 20 and a jet of air discharged from the nozzle and directed toward the inner edge 86 of the scraper will facilitate removal or peeling of the molded food portion from the adjacent surface of the associated piston. Also, if desired for facilitating removal of the molded food portion at the discharge end 18 of the device, the outer arcuate surface 40 of the pistons, and the surfaces 94 of the cylinders can be coated with a material such as Teflon for this purpose.

By adjustment of the screw 68, the radial position of the adjustable cam 64 can be varied with respect to the adjacent cam 62, to thus increase or decrease the depth of the mold chamber 74 to regulate the weight or thickness of the mold portions or patties formed therein.

For any desired rotational adjustment of the position of cams 62 and 64, loosening of the set screw 56 in the slot 58 and adjustment of the rotational position of member 52 by means of the handle 60 will accomplish this.

It will be understood that any suitably designed cam means can be employed in place of cams 62 and 64. Thus, for example, more than two cams can be employed, and such cams suitably mounted for adjustment as described above, or if desired, a single suitably designed cam can be employed.

It will be understood that although four cylinders and four associated pistons have been shown in the device of FIGURES 1 to 5, any desired number of cylinders and their associated pistons can be disposed radially around the drum and that by increasing the number of such cylinders and their associated pistons, there will be a corresponding increase in capacity, that is, a corresponding number of molded food portions or patties produced per revolution of the drum.

Further, it will be understood that there may be two or more series of radially disposed cylinders and their associated pistons disposed longitudinally in the drum. Thus, for example, as illustrated in FIGURE 6, the drum 22' can carry a first set of radially disposed cylinders and associated pistons indicated at 93, with their axes in one plane and a second series of radially disposed cylinders and associated pistons indicated at 94, with their axes in another common plane parallel to the plane of the cylinders and associated pistons 93. By extending the casing ring 10 of FIGURE 1, as indicated by broken lines at 10' in FIGURE 1, and by providing a second longitudinally disposed filler opening and filler nozzle 16' on the upper side of the casing ring and a second diagonally opposed and longitudinally spaced discharge opening 18' on the under side of the extended ring 10', and by providing an additional set of cams such as 62 and 64 for operating the second series of pistons associated with the second set of cylinders at 94 in FIGURE 6, the capacity of the device can be substantially increased, thereby producing a large number of molded food portions or patties per revolution of the drum.

It will also be understood, of course, that the molded food portions or patties can be formed into any desired shape, e.g., cylindrical, as in the case of the device of FIGURES 1 to 5, or square-shaped as indicated at 96 in FIGURE 7 of the drawing, or any other suitable shape such as triangular, hexagonal or any other polygonal shape.

I claim:
1. A food portioning machine which comprises a rotatable drum having a plurality of radially disposed cylinders, a free piston reciprocable in each of said cylinders, an outer stationary casing member in contact with the periphery of said drum, a filling opening in said casing member providing a filling station, a discharge station, each of said cylinders capable of registering with said filling station while another of said cylinders registers with said discharge station, to receive material from said filling opening at said filling station and to dscharge said material at said discharge station, stop means associated with each of said pistons and limiting outward movement thereof beyond the periphery of said drum, said stop means including a plate member mounted on the inner end of each of said pistons, and an inner shoulder formed on said drum adjacent the inner end of each of said cylinders, said plate member on each of said pistons abutting said adjacent inner shoulder in the outermost radial position of each of said pistons, means for preventing rotation of each of said pistons in their respective cylinders, said last mentioned means including contact members carried on each of said plate members and an inner side wall provided in said drum, said contact members abutting said inner side wall and permitting reciprocable motion of said pistons but preventing rotation of said pistons, stationary cam means mounted within said drum, the inner ends of each of said pistons riding on said cam means during rotation of said drum and limiting inner movement of said pistons, each of said pistons when registering with said filling station being retracted radially inward on said cam means to permit receiving a predetermined portion of material in the outer end of its cylinder, and to form said material into a predetermined shape, and each of said pistons when registering with said discharge station being urged to its outermost radial position by said cam means to eject said shaped portion of material.

2. A food portioning machine as defined in claim 1, said plate member at the inner end of each of said pistons having a straight edge, said contact members mounted on said straight edge, said straight edge of said plate members being disposed adjacent said inner side wall with said contact members in movable contact with said side wall.

3. A food portioning machine as defined in claim 1, including a hollow centrally disposed drive shaft for said drum, a cam support member mounted within the bore of said drive shaft, the inner end of said member extending into said drum, said cam means including a first cam and a second cam disposed adjacent said first cam, said second cam having a lobe disposed radially outward adjacent said filling station, a piston disposed at said filling station riding on said outwardly disposed lobe of said second cam, said first cam having a lobe disposed radially outward at the discharge station, whereby a piston riding on said radially outer lobe of said first cam at said discharge station is disposed in its outermost radial position at the peripheral surface of said drum, said first cam being fixedly connected on the inner end of said support member and said second cam containing a slot therein, the inner end of said support member being received in said slot to permit limited radial adjustment of said second cam on said support member, cam adjusting means connected to said second cam and to the inner end of said cam support member for radial adjustment of said second cam to adjust the thickness of mold in an outer end of a cylinder adjacent the associated piston, means connected to the outer end of said cam support member and supporting same in fixed position, and means associated with said last mentioned support means for rotational adjustment of said cam support member and said cams mounted thereon.

4. A food portioning machine as defined in claim 3, said cam adjusting means comprising screw means connected to said second cam and threadably engaged with the inner end of said cam support member.

5. A food portioning machine as defined in claim 4, said drum having four radially disposed cylinders positioned 90° from each other, said stop means including a plate member on the inner end of each of said pistons, said plate member having a straight edge, said means for preventing rotation of each of said pistons including lug members mounted on said straight edge, and a side wall provided in the interior of said drum, said straight edge of said pistons being disposed adjacent said inner side wall with said lug members in slidable contact with said side wall and permitting reciprocable motion of said pistons but preventing rotational movement of said pistons.

6. A food portioning machine as defined in claim 4, said plate member at the inner end of each of said pistons having a straight edge, said contact members mounted on said straight edge, said straight edge of said plate members being disposed adjacent said inner side wall with said contact members in movable contact with said side wall.

References Cited
UNITED STATES PATENTS

| | | | |
|---|---|---|---|
| 709,793 | 9/1902 | McGinnity | 107—15.5 |
| 2,528,234 | 10/1950 | Lilien | 17—32 |
| 2,708,287 | 5/1955 | Long et al. | 17—32 |
| 3,096,540 | 7/1963 | Miller et al. | 17—32 |

EDWARD L. ROBERTS, Primary Examiner

U.S. Cl. X.R.

17—32